June 22, 1926. 1,590,168
O. J. KUHLKE
METHOD FOR MANUFACTURING PNEUMATIC TIRES AND APPARATUS THEREFOR
Filed August 31, 1923 3 Sheets-Sheet 1

June 22, 1926.

O. J. KUHLKE 1,590,168

METHOD FOR MANUFACTURING PNEUMATIC TIRES AND APPARATUS THEREFOR

Filed August 31, 1923    3 Sheets-Sheet 2

Inventor
OTTO J. KUHLKE.

By
Attorney

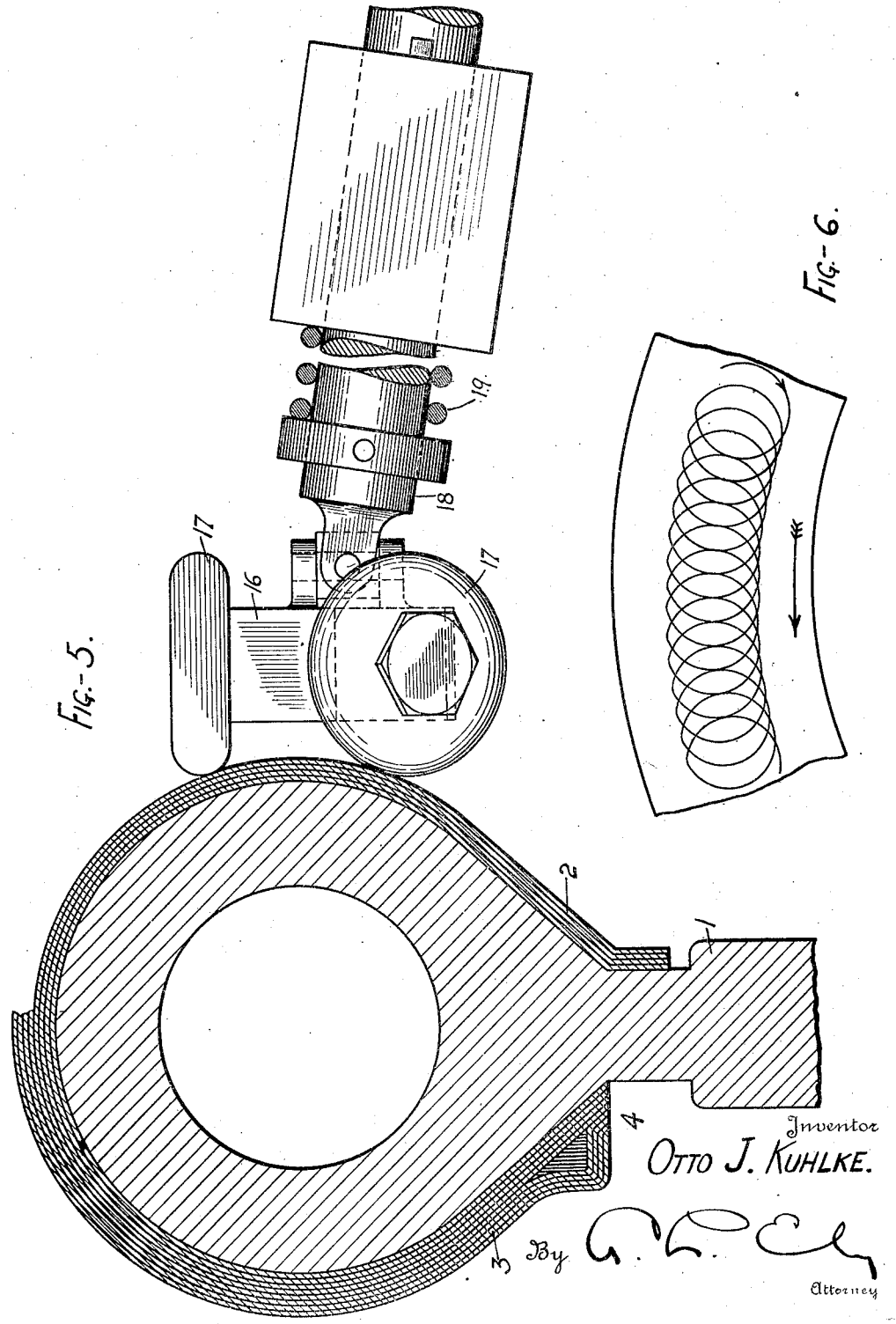

Patented June 22, 1926.

1,590,168

UNITED STATES PATENT OFFICE.

OTTO J. KUHLKE, OF AKRON, OHIO, ASSIGNOR TO THE KUHLKE MACHINE COMPANY, OF AKRON, OHIO, A CORPORATION OF OHIO.

METHOD FOR MANUFACTURING PNEUMATIC TIRES AND APPARATUS THEREFOR.

Application filed August 31, 1923. Serial No. 660,328.

This invention relates to the manufacture of the carcass of a pneumatic tire, and particularly to a method of shaping the tire fabric about the core, which differs in material ways from methods heretofore used. The new method will quickly and smoothly apply the fabric to the core. The invention also includes an improvement for shaping the fabric around and to the under side of the bead and for trimming the fabric if desired.

The invention also includes the implements for use in carrying out the method both on the main portion of the tire or under bead plies and also about the bead.

In the drawings are shown two forms of the device and particular embodiments of the method as more fully described, but it will be appreciated that changes and modifications may be made within the scope of the invention as set forth in the appended claims.

In the drawings:

Figure 1 is a sectional view of a tire core with a group of the shaping instrumentalities applied thereto, the core being divided along its central line, those instrumentalities to the right being shown for shaping the major portion and under bead plies about the tire core, while the left hand side of the core shows the over-bead plies and the bead forming roller in position. This view is a section on the line 1—1 of Figure 2.

Figure 4 is a view looking at the under side of one of the shaping instrumentalities.

Figure 5 is a view of a modified form of the invention.

Figure 6 is a diagrammatic view showing a portion of the path of travel thereof.

In the manufacture of tire casings heretofore in general practice, there have been two types of machines which have predominated. One of these machines is of the spinning roller type in which the shaping roller has been in the form of a flat disk, the edge of which was pressed against the core in rapid rotation and gradually moved inwardly toward the bead, progressively shaping the fabric about the core. A second type of machine in general use is one embodying a plurality of small rollers, or other instrumentalities, placed in a stepped fashion about the core which has been revolved slowly, the rollers attacking the fabric in separate circles approaching the bead line and shaping and attaching the fabric about the core.

By the improved and novel method set forth herein, both systems are discarded and a new method employed, wherein the fabric is acted upon by a series of rollers rotating about small orbits on the sides of the tire and by continuous unbroken spirals, repeated and superposed one over the other, is smoothly applied about the sides of the core. The method also includes the shaping of the fabric constituting the over bead layers around and beneath the bead of the tire by a stroking action which smoothly applies the fabric to the outer surface and under side of the bead.

The succession of spiral areas or zones about the sides of the core may be obtained either by a series of shaping rollers or units placed in stepped relation and gradually approaching the bead or by a single shaping unit moved in a spiral path progressively from the tread area to the bead line of the tire.

Figure 1:
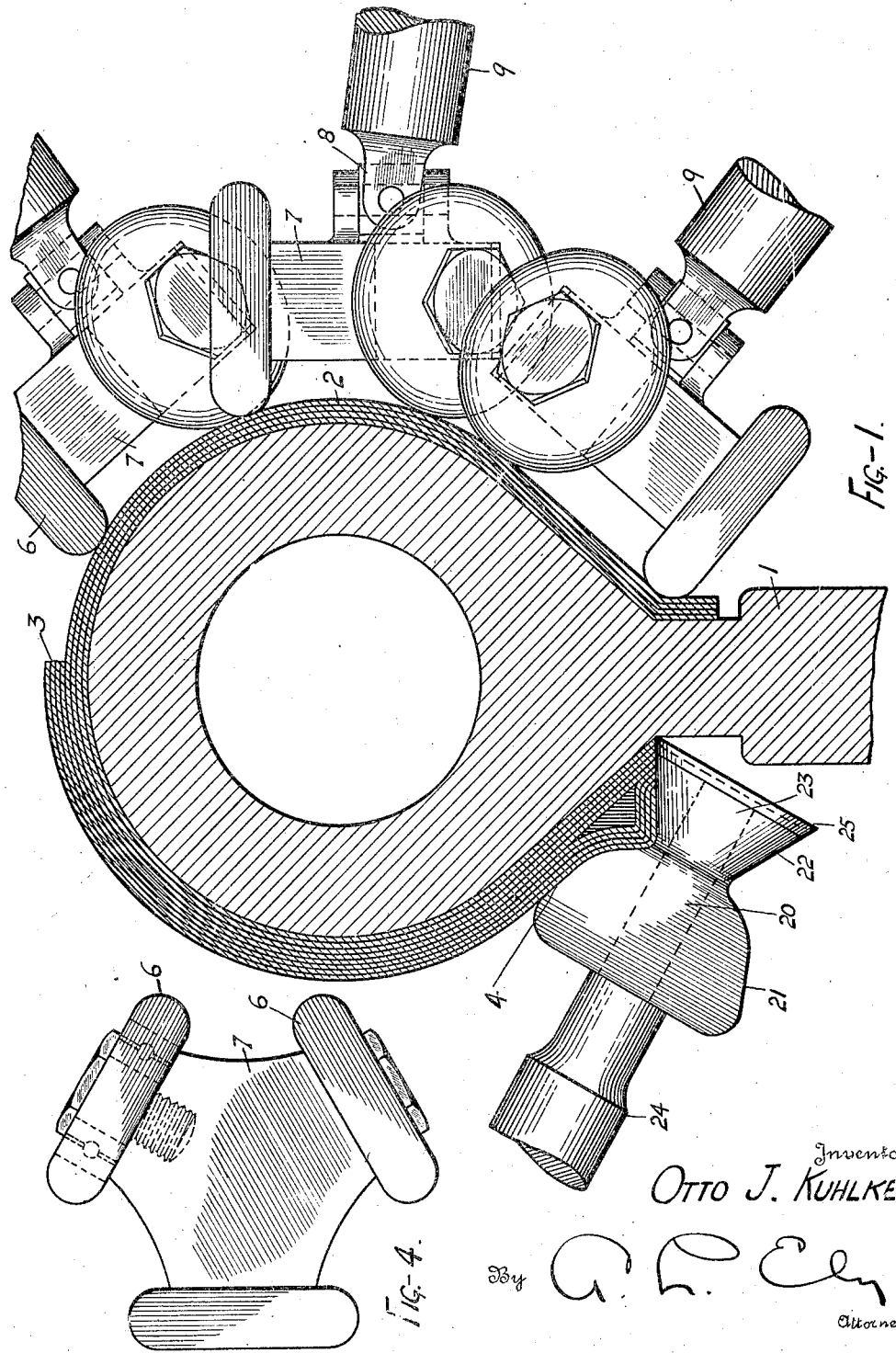

In the drawings, a conventional form of tire core is illustrated at 1, the tire being built thereon being shown as an eight ply tire, although it will be appreciated that the number of plies is immaterial and may be changed as desired. The under bead plies are denoted by the numeral 2 and are shown at the right of Figure 1, while the over bead plies, which are broken away at the tread for the sake of convenience of illustration and description, are indicated by the numeral 3. The bead, which is shown as of the straight side type, is indicated by the numeral 4, but it will be understood that other types of beads may be used if desired.

For shaping the under bead plies about the core, it is proposed to use a novel form of shaping device which acts upon the core in a new and improved manner and gradually and progressively strokes or "swipes" the fabric into smooth relation to the core.

The improved device is illustrated in Figure 1 of the drawings and consists of a group of rollers movable in small orbits over the sides of the core from the region of the tread to the bead. The several orbital paths produced by the rollers are arranged to overlap in the manner to be described, so that each orbital path attacks a portion of the unapplied fabric and shapes it to the core.

In Figure 1, there are shown groups of these rollers, three groups constituting a complete set on one side of the tire, it being understood that the set is duplicated on the other side of the tire.

The rollers, indicated by the numeral 6, are preferably small, rounded edged rollers arranged in groups of three and positioned at equidistant points about a head 7. In the form shown in Figure 1, three of these groups or heads 7 are arranged about the tire from the region of the tread to the bead and each head is carried upon a universal joint 8 which is connected to a driving shaft 9 whereby the heads can be rotated. In this manner each set of rollers will describe a spiral path over the side of the tire and the spiral paths will overlap slightly so that the rollers start upon the fabric after it has been applied and shape it from that point on through a definite zone, from which point the smoothing and application of the fabric is carried on to the next zone and so on until the whole of the fabric is smoothly applied to the core. It will be appreciated that the number of sets may be increased or diminished as desired or found practicable.

Figure 2:
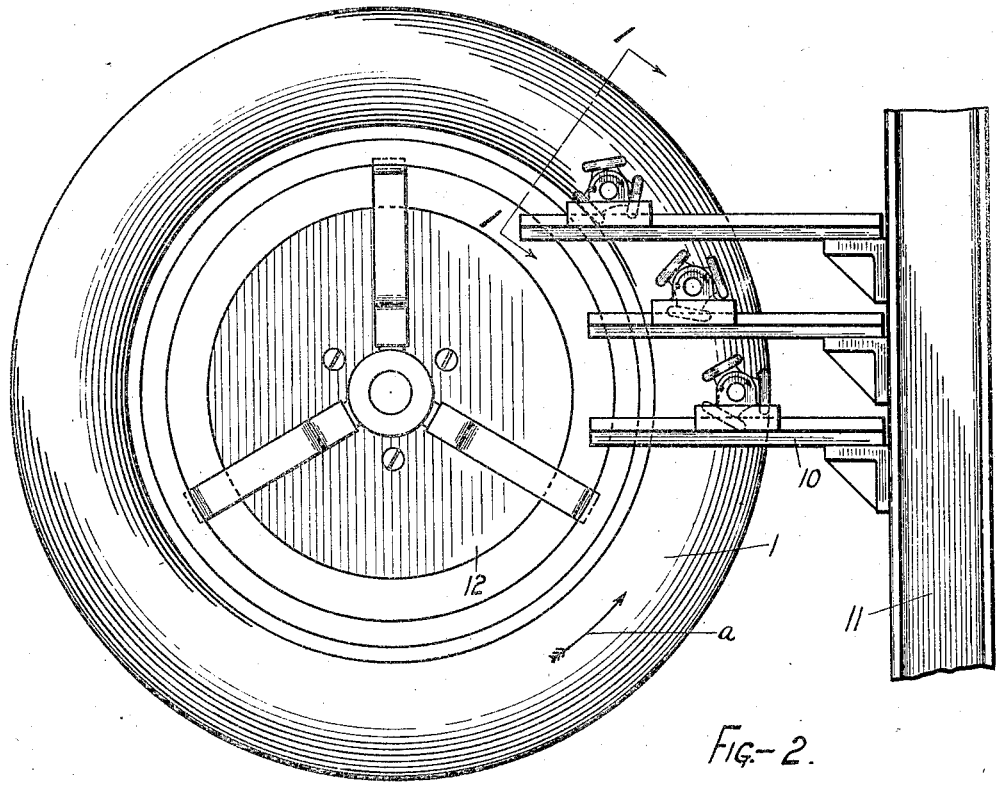
Figure 2 is a side elevation of the tire core.
Figure 3:
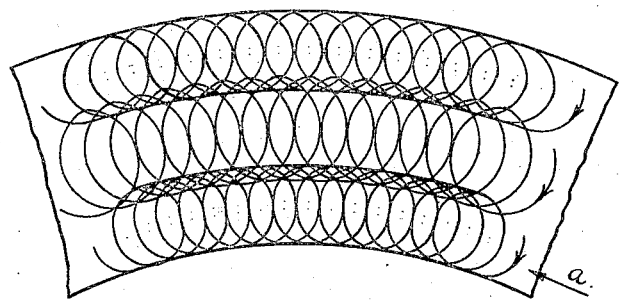
Figure 3 is a diagrammatic view showing the paths taken by the shaping instrumentalities.

In Figure 2, a suitable arrangement of the shaping tools is shown, wherein each unit, composed of a head and three rollers, is carried upon a swinging arm 10 supported upon a stanchion or upright 11. The core is carried upon the usual rotary chuck 12 and is rotated in the direction of the arrow "a". The rotary heads are moved in the direction indicated by the arrows upon the spiral lines as indicated in Figure 3. The several groups of rollers may be moved into operative position successively, it being designed to allow the action of one group to be commenced before moving the other group into position.

As a modification of the invention, the rotary heads arranged in the gang formation as shown in Figures 1 and 2 may be replaced by a single head 16 carrying the set of rollers 17 and supported by the rotating universal shafting indicated by the numeral 18. In this case the rollers may be advanced bodily radially of the core as it rotates so that the spiral paths described by the rollers will decrease in circumference toward the bead of the tire. This action is illustrated in Figure 6, where it will be found that the track of the rollers operates upon a spiral toward the bead line of the tire. It will be understood that the head 16 is duplicated upon the opposite side of the tire and that any suitable means may be provided to feed the head inwardly while the core is in rotation.

The fabric may be applied to the core in any known fashion and under any degree of circumferential stretch, it being considered unnecessary to describe this portion of the tire building operation.

For shaping the fabric around the bead, use is made of a different type of roller, which also may have incorporated therewith a trimming mechanism. For this purpose, a roll such as shown at 20 in Figure 1 is designed, which comprises a bell-shaped upper portion 21, the profile of which fits against the outer side of the bead. A conical extension 22 is carried upon the roller which fits against the under side of the bead. The roller 20 is carried upon an eccentric shaft 23 on the end of a rotating shaft 24 which is supported at an angle to the plane of the core so that the surfaces 21 and 22 will coincide with the surfaces of the tire upon which they operate. As the shaft 24 rotates, the roller will be moved against the surface of the tire in a series of arcs and with a consequent swiping action which shapes the fabric as will be understood. It will be perceived that the action obtained by this device is not a rolling action, but is a wiping action, the rotation of the roller and the rotation of the core being so timed that the fabric will be properly shaped in position.

If desired, a trimming mechanism may be incorporated with the bead shaping roller by the addition of a knife 25 carried upon the end of the portion 22 of the roller which will operate to sever the fabric at the base of the bead.

It will be seen that the purpose of this invention is to shape tire fabric to the sides of the core by means of a series of continuous unbroken spiral strokes exerted upon the fabric from near the tread of the tire to the bead, the spirals covering a plurality of zones, each zone overlapping its predecessor slightly, whereby the fabric is wiped into place and the requisite shortening or condensing is accomplished. As this is a new, novel and useful method of forming tire fabric, the claims hereto appended are entitled to a liberal construction or range of equivalents within the limits of the prior art.

What is claimed is:

1. The method of shaping tire fabric about a core, comprising exerting upon the unapplied skirts of the fabric a wiping action generated by a series of unbroken spiral strokes extending from the tread to the bead line of the tire in a plurality of overlapping zones.

2. The method of shaping tire fabric about a core, comprising exerting upon the unapplied skirts of the fabric while the core is in rotation a continuous wiping action generated by an unbroken spiral stroke, the axis of which is substantially circumferential of the tire.

3. The method of shaping tire fabric about a core, comprising exerting upon the unapplied skirts of the fabric a wiping action in the direction of the bead generated by a continuous spiral loop.

4. The method of shaping tire fabric about a core, comprising rotating the core and at the same time exerting upon the unapplied skirts of the fabric a wiping action generated by numerous repeated continuous spirals extending circumferentially of the tire.

5. The method of shaping tire fabric about a core, comprising rotating the core and simultaneously exerting upon the unapplied skirts of the fabric a wiping action generated by moving a shaping element over the side of the core in a circular path in contact with the core throughout.

6. The method of shaping tire fabric about a core, comprising rotating the core and simultaneously exerting upon the unapplied skirts of the fabric a wiping action from the tread toward the bead by moving a shaping element over the side of the core in an unbroken circular path through a zone of the tire.

7. The method of shaping tire fabric about a core, comprising rotating the core and simultaneously exerting upon the unapplied skirts of the fabric wiping action from the tread toward the bead by moving shaping elements over the sides of the core in unbroken circular paths through definite zones, each zone overlapping the preceding zone.

8. The method of shaping tire fabric about a core, comprising rotating the core and simultaneously exerting upon the unapplied skirts of the fabric wiping action from the tread toward the bead by moving shaping elements over the sides of the core in unbroken circular paths through definite zones which successively approach the bead line.

9. The method of shaping tire fabric about a core, comprising rotating the core and simultaneously exerting upon the unapplied skirts of the fabric a wiping action from the tread toward the bead by moving shaping elements over the sides of the core in unbroken circular paths through definite zones covering partial areas of the tire, the zones successively approaching the bead line.

10. The method of shaping tire fabric about a core, comprising rotating the core and simultaneously exerting upon the unapplied skirts of the fabric a wiping action from the tread toward the bead by moving shaping elements over the sides of the core in unbroken circular paths through definite zones covering partial areas of the tire, the zones successively approaching the bead line, each zone overlapping the preceding zone.

11. An implement for shaping tire fabric about a core, comprising a rotatable head, the axis of which is directed toward the center of the core, and a roller upon the head in continuous edge contact with the core.

12. An implement for shaping tire fabric about a core, comprising a rotatable head, the axis of which is directed toward the center of the core, and a plurality of rollers mounted about the head so as simultaneously to contact with the surface of the core, the axes of the rollers radiating from the center of the head.

13. An implement for shaping tire fabric about a core, comprising a rotatable head, a universal mounting for the head, and a plurality of rollers mounted about the head and adapted to have a continuous edge contact with the core.

14. An implement for shaping tire fabric about a core, comprising a rotatable head, a universal mounting for the head, and three rollers mounted on the head with their axes directed toward the center of the head and with their edges adapted continuously to contact with the core.

15. An implement for shaping tire fabric about a core, comprising a rotatable head, a universal mounting for the head, and three rollers on the head having their edges adapted continuously to contact with the core.

OTTO J. KUHLKE.